United States Patent
Takano et al.

[11] Patent Number: 5,828,479
[45] Date of Patent: Oct. 27, 1998

[54] CASCADE SCANNING OPTICAL SYSTEM

[75] Inventors: Masatoshi Takano; Eiji Takasugi; Shinji Kikuchi; Tsutomu Sato; Hiroyuki Saito; Yoshiyuki Araki; Mitsunori Iima; Takashi Sasaki; Takashi Iizuka, all of Tokyo, Japan

[73] Assignee: Asahi Kogaku Kogyo Kabushiki Kaisha, Tokyo, Japan

[21] Appl. No.: 929,003

[22] Filed: Sep. 4, 1997

[30] Foreign Application Priority Data

Sep. 5, 1996 [JP] Japan ..................... 8-235401

[51] Int. Cl.$^6$ .................................... G02B 26/08
[52] U.S. Cl. ................. 359/201; 359/204; 359/210; 359/216; 347/233
[58] Field of Search .................... 359/201–206, 359/209, 210, 212, 216–219, 822, 823, 825, 871, 872; 347/233, 235; 358/474, 481, 494

[56] References Cited

U.S. PATENT DOCUMENTS 5,461,414 10/1995 Honda et al. .

FOREIGN PATENT DOCUMENTS

| | | |
|---|---|---|
| 58-130672 | 8/1983 | Japan . |
| 58-158623 | 9/1983 | Japan . |
| 58-162916 | 9/1983 | Japan . |
| 60-28618 | 2/1985 | Japan . |
| 60-35712 | 2/1985 | Japan . |
| 60-57316 | 4/1985 | Japan . |
| 61-11720 | 1/1986 | Japan . |
| 61-42615 | 3/1986 | Japan . |
| 63-50809 | 3/1988 | Japan . |

OTHER PUBLICATIONS

An English Language excerpt from Konica Technical Report, vol. 9, (1996).

A Japanese Language excerpt from Konica Technical Report, vol. 9, (1996).

*Primary Examiner*—James Phan
*Attorney, Agent, or Firm*—Greenblum & Bernstein, P.L.C.

[57] ABSTRACT

A cascade scanning optical system which includes: a pair of laser scanning optical systems each having a laser beam emitter and a laser beam deflector, wherein a laser beam emitted by the laser beam emitter enters the laser beam deflector so that the laser beam deflector deflects the laser beam to scan a surface of a member such that the laser beams proceed to the surface on a common line thereon in respective ranges of the common line; a pair of mirrors respectively provided in the pair of laser scanning optical systems, each of the pair of mirrors being positioned in a corresponding optical path between the laser beam deflector and the member to reflect a laser beam incident thereon toward the surface; a pair of cylindrical lenses having power in a sub-scanning direction, respectively provided in the pair of laser scanning optical systems, each of the pair of cylindrical lenses being positioned in a corresponding optical path between the laser beam emitter and the laser beam deflector; first means for adjusting an angle of at least one of the pair of mirrors relative to the surface; and second means for adjusting a position of at least one of the pair of cylindrical lenses relative to a corresponding one of the laser beam deflectors.

9 Claims, 8 Drawing Sheets

CASCADE SCANNING OPTICAL SYSTEM

BACKGROUND OF THE INVENTION

1. Field of the Invention

The present invention relates to a cascade scanning optical system having a plurality of laser scanning optical systems which are arranged along the main scanning direction and controlled to operate in synchronization with each other so as to realize a wide scanning line.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No. 61-11720, published on Jan. 20, 1986. This publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately combined with another scanning line, made on the photoconductive drum by the scanning laser beam emitted from another laser scanning optical system of the cascade scanning optical system, so as not to be apart from each other or overlap each other in either the main scanning direction or the sub-scanning direction, i.e., so as to form a straight and continuous scanning line using a combination of the separate scanning lines.

SUMMARY OF THE INVENTION

The primary object of the present invention is to provide a cascade scanning optical system having an adjusting mechanism for adjusting the incident position of each scanning laser beam incident upon a scanning surface in the sub-scanning direction to make a scanning line, made by the scanning laser beam emitted from one laser scanning optical system, and another scanning line, made by the scanning laser beam emitted from another laser scanning optical system, align in the main scanning direction to thereby form a straight and continuous wide scanning line by a combination of the two scanning lines.

To achieve the object mentioned above, according to an aspect of the present invention, there is provided a cascade scanning optical system which includes: a pair of laser scanning optical systems each having a laser beam emitter and a laser beam deflector, wherein a laser beam emitted by the laser beam emitter enters the laser beam deflector so that the laser beam deflector deflects the laser beam to scan a surface of a member such that the laser beams proceed to the surface on a common line thereon in respective ranges of the common line; a pair of mirrors respectively provided in the pair of laser scanning optical systems, each of the pair of mirrors being positioned in a corresponding optical path between the laser beam deflector and the member to reflect a laser beam incident thereon toward the surface; a pair of cylindrical lenses having power in a sub-scanning direction, respectively provided in the pair of laser scanning optical systems, each of the pair of cylindrical lenses being positioned in a corresponding optical path between the laser beam emitter and the laser beam deflector; first means for adjusting an angle of at least one of the pair of mirrors relative to the surface; and second means for adjusting a position of at least one of the pair of cylindrical lenses relative to a corresponding one of the laser beam deflectors. With this arrangement, the incident position of at least one of the pair of laser beams incident on the surface of the member can be roughly and finely adjusted in the sub-scanning direction using the first means and the second means, respectively, to make a scanning line, made by the laser beam emitted from one of the pair of laser scanning optical systems, and another scanning line, made by the laser beam emitted from the other of the pair of laser scanning optical systems, align in the main scanning direction to thereby form a straight and continuous wide scanning line by a combination of the two scanning lines.

Preferably, the first means is adjusted to adjust an incident position of a laser beam reflected by the at least one of the pair of mirrors to be incident on the surface, in the sub-scanning direction, and the second means is adjusted to adjust an incident position of a laser beam emitted from the at least one of the pair of cylindrical lenses to be incident on the corresponding one of the laser beam deflectors, in the sub-scanning direction.

Preferably, the lateral magnification of an overall optical system provided in each of the pair of scanning optical systems in a corresponding optical path between the laser beam deflector and the member is predetermined such that the absolute value of the lateral magnification is less than 1.

Preferably, the first means is adjusted for adjusting an angle of only one of the pair of mirrors relative to the surface, and wherein the second means is adjusted for adjusting a position of each of the cylindrical lenses relative to the corresponding one of the laser beam deflectors.

Preferably, the second means is adjusted for adjusting an angular position of the at least one of the pair of cylindrical lenses relative to the corresponding one of the laser beam deflectors by rotating the at least one of the pair of cylindrical lenses.

Preferably, the second means is adjusted for adjusting the position by shifting the at least one of the pair of cylindrical lenses in the sub-scanning direction.

Preferably, the member is a drum having the surface on a periphery of the drum, wherein the polygon mirror deflects the laser beam to scan the surface such that the laser beams proceed to the surface on the common line thereon extending in an axial direction of the drum in the respective ranges of the common line.

Preferably, the laser beam deflector is a polygon mirror.

According to another aspect of the present invention, there is provided a cascade scanning optical system which includes: a pair of laser scanning optical systems each having a laser beam emitter and a polygon mirror, wherein a laser beam emitted by the laser beam emitter enters the polygon mirror so that the polygon mirror deflects the laser beam to scan a surface of a drum such that the laser beams proceed to the surface on a common line thereon extending in an axial direction of the drum in respective ranges of the common line; a pair of mirrors respectively provided in the pair of laser scanning optical systems, each of the pair of mirrors being positioned in a corresponding optical path between the polygon mirror and the drum to reflect a laser beam incident thereon toward the surface; a pair of cylindrical lenses each having power in a sub-scanning direction, respectively provided in the pair of laser scanning optical systems, each of the pair of cylindrical lenses being positioned in a corresponding optical path between the laser beam emitter and the polygon mirror; a first adjusting device for adjusting an angle of one of the pair of mirrors relative to the surface; a second adjusting device for adjusting a position of one of the pair of cylindrical lenses relative to a corresponding one of the polygon mirrors; and a third adjusting device for adjusting a position of the other of the pair of cylindrical lenses relative to the other of the polygon mirrors.

The present disclosure relates to subject matter contained in Japanese Patent Application No. 8-235401 (filed on Sept. 5, 1996) which is expressly incorporated herein by reference in its entirety.

BRIEF DESCRIPTION OF THE DRAWINGS

The invention will be described below in detail with reference to the accompanying drawings in which similar reference numerals indicate similar parts, and wherein.

DESCRIPTION OF THE PREFERRED EMBODIMENTS

Figure 1:
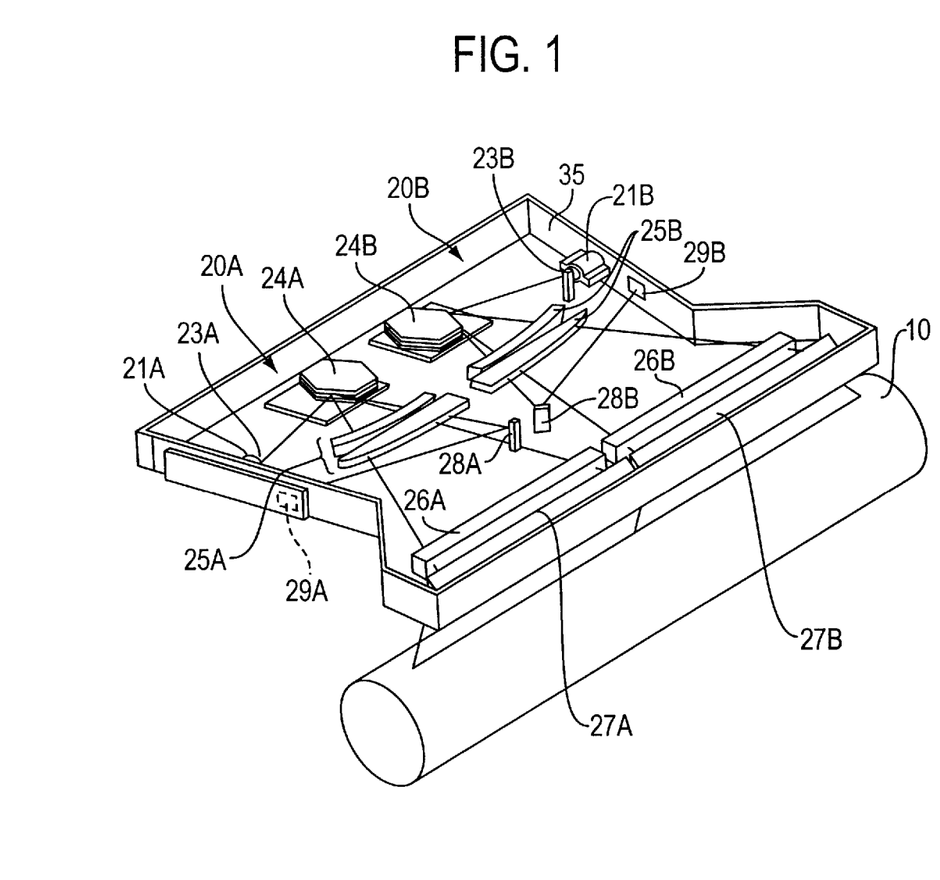
FIG. 1 is a perspective view of a first embodiment of a cascade scanning optical system to which the present invention is applied, showing only fundamental elements thereof.

FIG. 1 shows a first embodiment of a cascade scanning optical system for scanning the photoconductive surface of a photoconductive drum (rotating member) 10 provided in a laser-beam printer. The cascade scanning optical system is provided with a pair of laser scanning optical systems, i.e., a first scanning optical system 20A and a second scanning optical system 20B. Each of the first and second optical systems 20A and 20B is designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror (laser beam deflector) 24A, an fθ lens group 25A, an auxiliary lens 26A and a mirror 27A, while the second scanning optical system 20B is provided with a laser collimating unit 21B serving as a laser beam emitter, a cylindrical lens 23B, a polygon mirror (laser beam deflector) 24B, an fθ lens group 25B, an auxiliary lens 26B and a mirror 27B. Each of the fθ lens groups 25A and 25B consists of two lens elements as can be seen from FIG. 1. The first and second scanning optical systems 20A and 20B are arranged side by side in a direction parallel to the axial direction of the drum 10 and are supported by a common casing 35 on an inner flat surface thereof.

Figure 8:
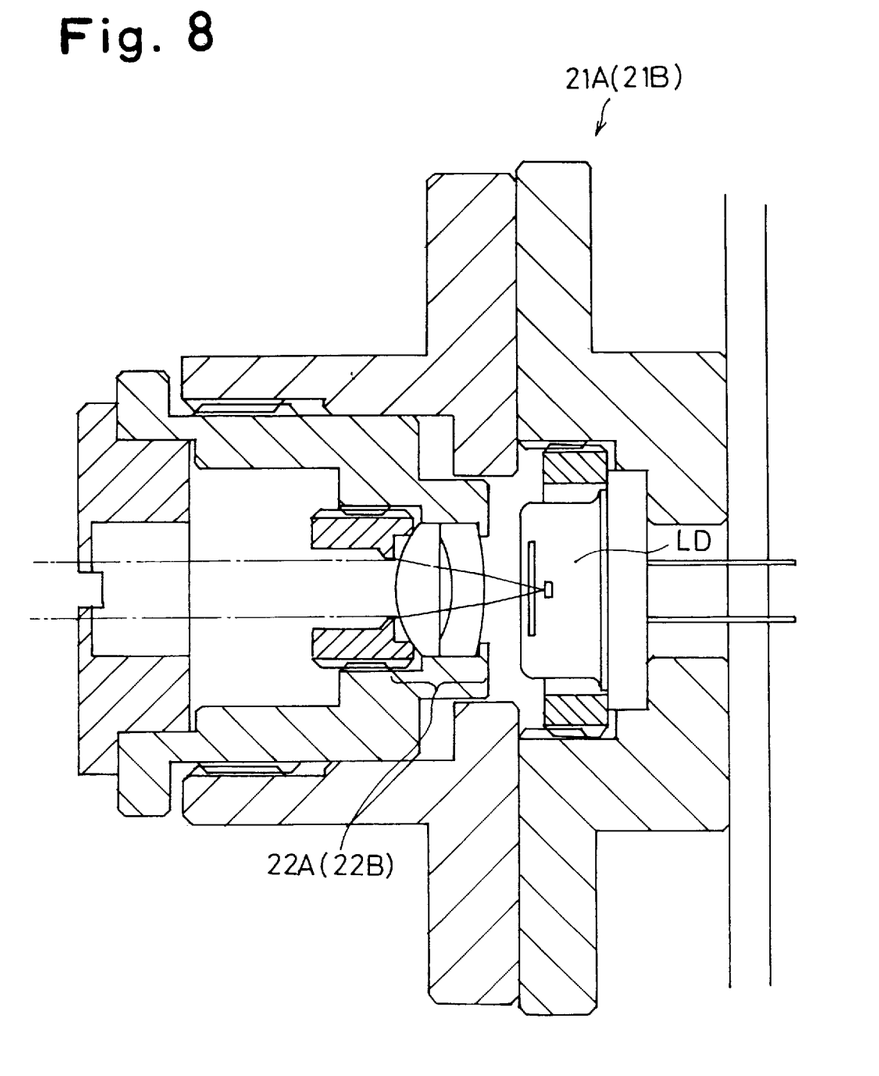
FIG. 8 is a cross sectional view of a laser collimating unit provided in the cascade scanning optical system shown in FIG. 1 or FIG. 2.

The laser collimating units 21A and 21B are identical. FIG. 8 shows the laser collimating unit 21A (21B). Each of the units 21A and 21B is provided with a laser diode LD and a collimating lens group 22A or 22B consisting of a pair of lens elements.

In each of the first and second scanning optical systems 20A and 20B, the laser beam emitted from the laser diode LD is collimated through the collimating lens group 22A or 22B. Thereafter this collimated laser beam is incident upon the cylindrical lens 23A or 23B positioned in front of the corresponding laser collimating unit 21A or 21B. The laser cylindrical lens 23A or 23B has a power in the sub-scanning direction, so that the spot of the laser beam incident thereon is elongated therethrough in the same direction to be incident upon the corresponding polygon mirror 24A or 24B. The polygon mirrors 24A and 24B are each driven to rotate, so that laser beams incident thereon are deflected in the main scanning direction to proceed toward the mirrors 27A and 27B through the fθ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the fθ lens groups 25A and 25B are designed to have a power similar to the power of the auxiliary lenses 26A and 26B, respectively.

The polygon mirror 24A rotates in a clockwise direction while the polygon mirror 24B rotates in a counterclockwise direction, as viewed in FIG. 1. Namely, the polygon mirrors 24A and 24B rotate in opposite rotational directions to scan the photoconductive surface of the drum 10 from its approximate center toward respective opposite ends in opposite directions. A mirror 28A is fixedly provided in the casing 35 at a position to receive the scanning laser beam emitted from the fθ lens group 25A before the scanning laser beam is incident on the photoconductive surface of the drum 10 through the auxiliary lens 26A and the mirror 27A at each scanning sweep while the polygon mirror 24A rotates. The laser beam reflected by the mirror 28A is incident on a laser beam detector 29A fixedly provided in the casing 35 at a position opposite to the mirror 28A. Likewise, a mirror 28B is fixedly provided in the casing 35 at a position to receive the scanning laser beam emitted from the fθ lens group 25B before the scanning laser beam is incident on the photoconductive surface of the drum 10 through the auxiliary lens 26B and the mirror 27B at each scanning sweep while the polygon mirror 24B rotates. The laser beam reflected by the mirror 28B is incident on a laser beam detector 29B fixedly provided in the casing 35 at a position opposite to the mirror 28B.

Figure 2:
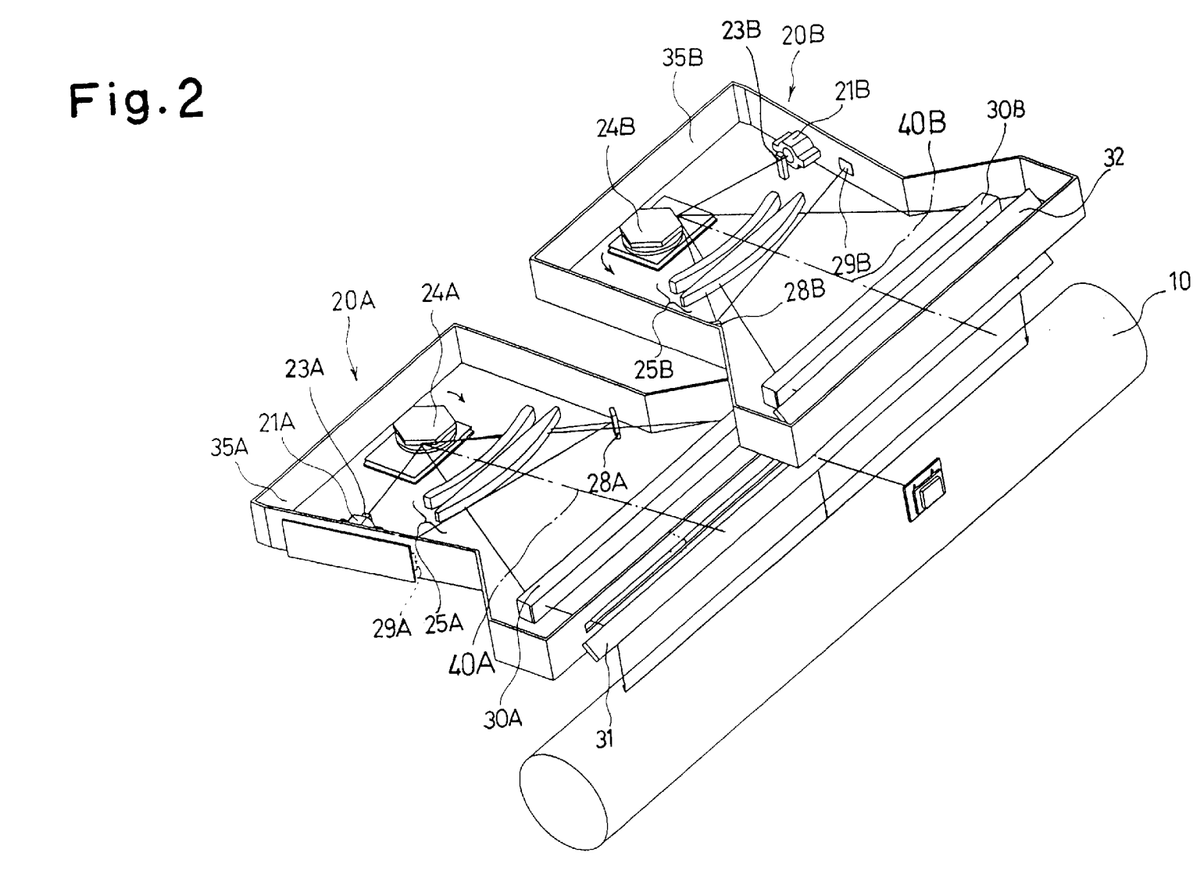
FIG. 2 is a perspective view of a second embodiment of a cascade scanning optical system to which the present invention is applied, showing only fundamental elements thereof.
Figure 3:
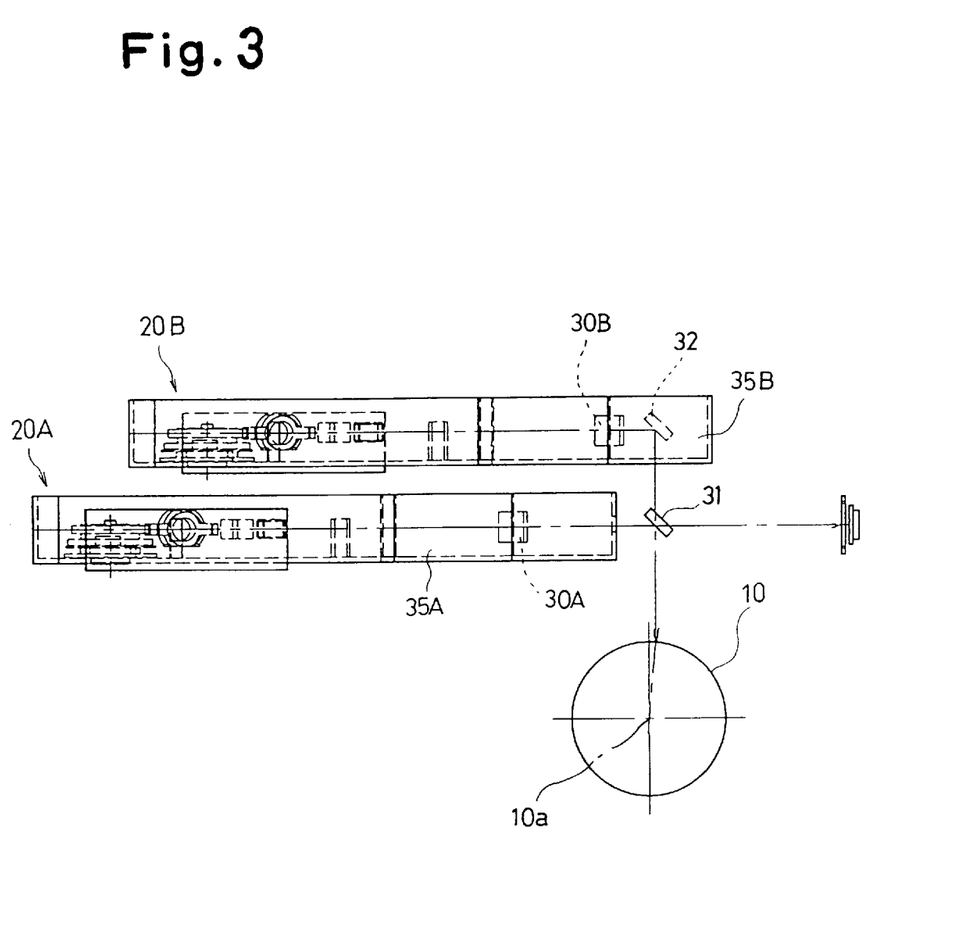
FIG. 3 is a side view of the cascade scanning optical system shown in FIG. 2, as viewed from the left hand side of FIG. 2.

FIGS. 2 and 3 show a second embodiment of a cascade scanning optical system for scanning the photoconductive surface of the drum 10, similarly to the first embodiment. This second embodiment of the cascade scanning optical system is also provided with a pair of laser scanning optical systems, i.e., the first scanning optical system 20A and the second scanning optical system 20B. Each of the first and second optical systems 20A and 20B is designed as a telecentric system, so that the laser beam emitted from each of the first and second scanning optical systems 20A and 20B is always incident on the photoconductive surface of the drum 10 in a direction perpendicular to a rotational axis 10a of the drum 10 (i.e., in a direction perpendicular to the axial direction of the drum 10), specifically in a direction orthogonal to generatrices of the drum 10.

The first and second scanning optical systems 20A and 20B are respectively supported by casings 35A and 35B which are arranged in parallel to each other and apart from each other both in a vertical direction (the vertical direction as viewed in FIG. 3) and also in the axial direction of the drum 10. Further, the casings 35A and 35B are arranged at different positions in the horizontal direction as viewed in FIG. 3.

In this second embodiment, the auxiliary lenses 26A and 26B used in the first embodiment are not provided. Instead, condenser lenses 30A and 30B are provided in the first and second scanning optical systems 20A and 20B, respectively.

There is provided an elongated fixed half mirror 31 serving as a beam splitter which extends along the first and second scanning optical systems 20A and 20B in the main scanning direction. The half mirror 31 is positioned in front of the condenser lens 30A to be angled relative to an optical path of the laser beam between the condenser lens 30A and the half mirror 31 by approximately 45°, so that the laser beam emitted from the condenser lens 30A is incident on one side of the half mirror 31 (first side). The laser beam emitted from the condenser lens 30A is directly incident upon the half mirror 31, and part of the incident laser beam passes through the half mirror 31 while the remaining part is reflected by the half mirror 31 to be incident on the photoconductive surface of the drum 10.

There is provided a fixed elongated mirror 32 which extends in parallel to the half mirror 31 in the main scanning direction and is positioned above the half mirror 31 in front of the condenser lens 30B to be angled relative to an optical path of the laser beam between the condenser lens 30B and the mirror 32 by approximately 45°, so that the laser beam reflected by the mirror 32 is incident on the other side of the half mirror 31 (second side). The laser beam emitted from the condenser lens 30B is directly incident upon the mirror 32 to be totally reflected thereby to enter the half mirror 31. The laser beam emitted from the condenser lens 30B to be totally reflected by the mirror 32 is incident upon the half mirror 31 in a direction orthogonal to the laser beam emitted from the condenser lens 30A (i.e., the laser beam emitted from the first scanning optical system 20A) to the half mirror 31. The mirror 32 is supported by the casing 35B while the half mirror 31 is supported by a supporting member (not shown) fixed relative to both the casings 35A and 35B.

As shown in FIG. 2, the length of the mirror 32 is sufficient to receive the laser beam emitted from the condenser lens 30B, while the length of the half mirror 31 is much longer than that of the mirror 32, approximately double the length of the mirror 32, to receive both laser beams emitted from the first and second scanning optical systems 20A and 20B.

The laser beam emitted from the laser collimating unit 21A to be subsequently deflected by the polygon mirror 24A, is converged by the fθ lens group 25A in the main and sub-scanning directions. This converged laser beam is then collimated by the condenser lens 30A to be a collimated laser beam which extends in parallel to the shortest optical path 40A between the fθ lens group 25A and the condenser lens 30A under the condition that "θ" is equal to zero (θ=0) in the equation "y=fθ" which shows the fθ lens characteristic. This collimated laser beam is incident upon the half mirror 31.

Similarly, the laser beam emitted from the laser collimating unit 21B to be subsequently deflected by the polygon mirror 24B is converged by the fθ lens group 25B in the main and sub-scanning directions. This converged laser beam is then collimated by the condenser lens 30B to be a collimated laser beam which extends in parallel to the shortest optical path 40B between the fθ lens group 25B and the condenser lens 30B under the condition that "θ" is equal to zero (θ=0) in the equation "y=fθ" which shows the fθ lens characteristic. This collimated laser beam is incident upon the mirror 32.

According to the above arrangement, the laser beam emitted from the condenser lens 30A to be partly reflected by the half mirror 31 and the other laser beam emitted from the condenser lens 30B to be reflected by the mirror 32 and partly passed through the half mirror 31, each proceed in a common plane to be always incident upon the photoconductive surface of the drum 10 in a direction perpendicular to a rotational axis 10a of the drum 10, specifically in a direction orthogonal to generatrices of the drum 10, and accordingly, each of the first and second scanning optical systems 20A and 20B is a telecentric system.

In this second embodiment, similarly to the first embodiment, the polygon mirror 24A rotates in a clockwise direction while the polygon mirror 24B rotates in a counterclockwise direction. Namely, the polygon mirrors 24A and 24B rotate in opposite rotational directions to scan the photoconductive surface of the drum 10 from its approximate center toward respective opposite ends in opposite directions. Also, the mirrors 28A and 28B and the laser beam detectors 29A and 29B are provided in the casings 35A and 35B, respectively, similarly to the first embodiment.

The laser beam emitters 21A and 21B are each controlled to turn its laser emission ON or OFF in accordance with given image data to draw a corresponding image (charge-latent image) on the photoconductive surface of the drum 10, and subsequently this image drawn on the photoconductive surface of the drum 10 is transferred to plain paper according to a conventional electrophotographic method.

In each of the first and second embodiments, the scanning laser beam emitted from the first scanning optical system 20A and the other scanning laser beam emitted from the second scanning optical system 20B are each projected onto the photoconductive surface of the drum 10, ideally on a common line extending in the axial direction of the drum 10 in respective different adjacent ranges of the common line to thereby form a straight and continuous wide scanning line on the photoconductive surface of the drum 10. Namely, the polygon mirrors 24A and 24B are controlled synchronously with the use of the laser beam detectors 29A and 29B, etc. such that the scanning starting point of a spot of the scanning laser beam emitted from the first scanning optical system 20A is properly and precisely adjacent to the scanning starting point of a spot of the scanning laser beam emitted from the second scanning optical system 20B on the photoconductive surface of the drum 10, and that the two spots move in opposite directions apart from each other in the main scanning direction to thereby form a wide scanning line on the photoconductive surface of the drum 10. With the rotational movement of the photoconductive drum 10, which is synchronized with the rotational movement of each polygon mirror 24A, 24B, a series of wide scanning lines are made on the photoconductive surface of the drum 10 to thereby obtain a certain image (charge-latent image) on the photoconductive surface of the drum 10.

Each of the first and second embodiments of the cascade scanning optical system is provided with an adjusting mechanism for adjusting the incident position of each of the pair of scanning laser beams (i.e., laser beams emitted from the first and second scanning optical systems 20A and 20B) incident upon the photoconductive surface of the drum 10 in the sub-scanning direction to make a scanning line, made by the laser beam emitted from the first scanning optical system 20A, and another scanning line, made by the laser beam emitted from the second scanning optical system 20B, align in the main scanning direction to thereby form a straight and continuous wide scanning line by a combination of those scanning lines. The adjusting mechanism consists of a first mechanism for adjusting the position or angle of at least one of the cylindrical lenses 23A and 23B and a second mechanism for adjusting the angle of at least one of the mirrors (27A, 27B, 31 or 32). These first and second mechanisms will be hereinafter discussed in detail.

Figure 4:
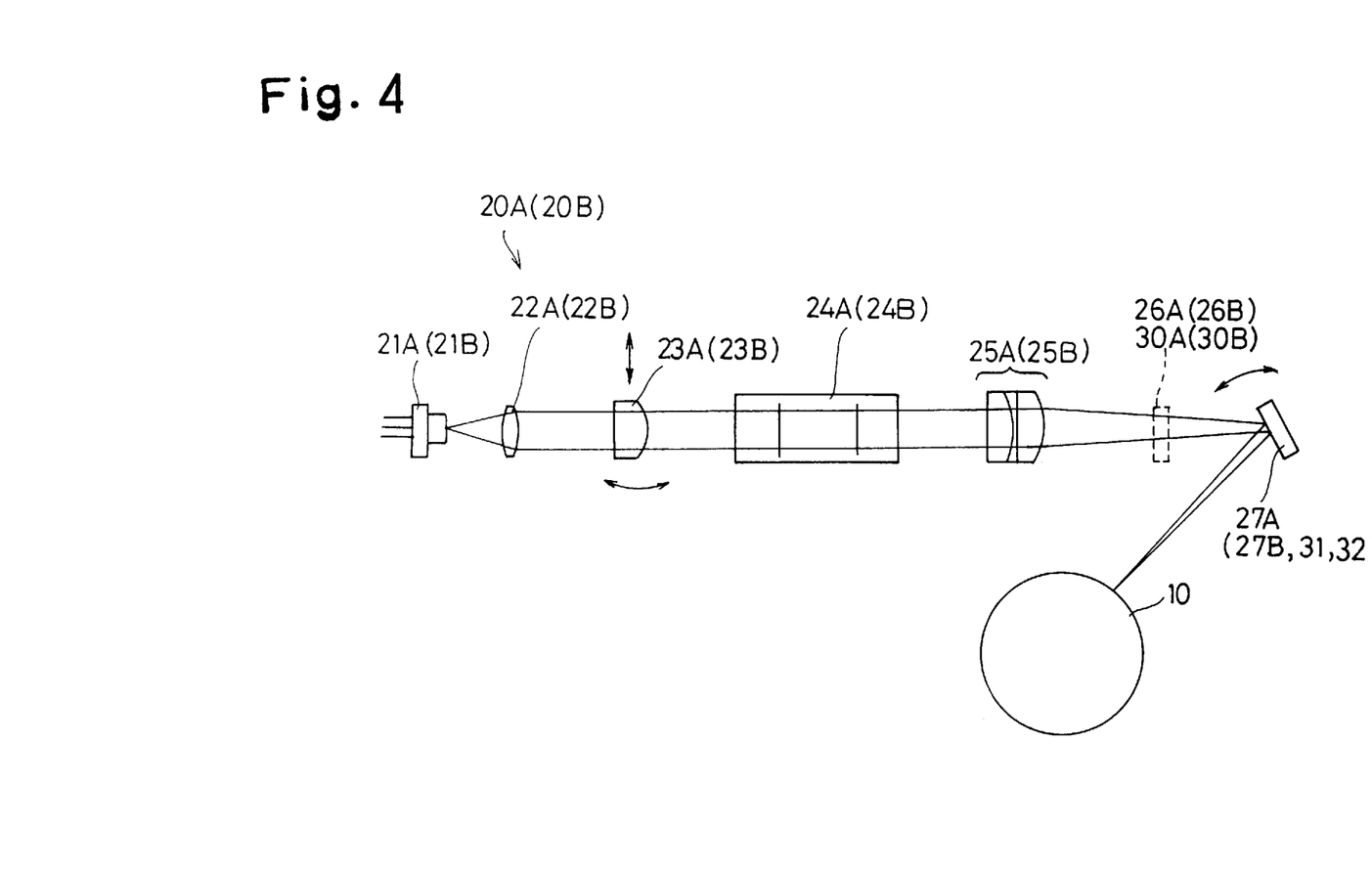
FIG. 4 is a developed view of each laser scanning optical system provided in the cascade scanning optical system shown in FIG. 1 or 2.

FIG. 4 shows the principle of how the incident position of each of the pair of scanning laser beams incident upon the photoconductive surface of the drum 10 can be shifted in the sub-scanning direction using the adjusting mechanism provided.

As will be appreciated from FIG. 4, the incident position of each of the pair of scanning laser beams incident upon the photoconductive surface of the drum 10 can be adjusted in the sub-scanning direction by adjusting the angle of the corresponding mirror 27A or 27B in the first embodiment, or by adjusting the angle of a corresponding one of the half mirror 31 and the mirror 32 in the second embodiment. The angle of each mirror (27A, 27B, 31 or 32) can be adjusted by tilting the same in the sub-scanning direction. The variation in the angle of the laser beam reflected by the mirror (27A, 27B, 31 or 32) to be incident on the drum 10 relative to the incident laser beam on the mirror is double the variation in the angle of the mirror, so that the incident position of each of the pair of scanning laser beams incident upon the photoconductive surface of the drum 10 can be roughly adjusted in the sub-scanning direction by adjusting the angle of the corresponding mirror 27A or 27B in the first embodiment, or by adjusting a corresponding one of the half mirror 31 and the mirror 32 in the second embodiment.

The incident position of each of the pair of scanning laser beams incident upon the photoconductive surface of the drum 10 can also be adjusted in the sub-scanning direction by adjusting the position or angle of the corresponding cylindrical lens 23A or 23B. The position or angle of each of the cylindrical lenses 23A and 23B can be adjusted by shifting the cylindrical lens relative to the corresponding polygon mirror 24A or 24B, or by rotating the cylindrical lens about a point on the optical axis thereof.

It is preferable in each of the first and second scanning optical systems 20A and 20B that the absolute value of the lateral magnification "m" of the overall optical system in the sub-scanning direction, which is provided in an optical path between the polygon mirror 24A (or 24B) and the photosensitive drum 10 should be less than 1. Namely, the following formula is preferably satisfied:

$$|m|<1$$

wherein "m" is the lateral magnification of the overall optical system in the sub-scanning direction which is provided between the polygon mirror 24A (or 24B) and the photosensitive drum 10.

An ordinary anamorphic fθ lens generally has a large lateral magnification (magnifying optical system), since the power of the anamorphic fθ lens is concentrated on a side thereof facing a polygon mirror. Due to this reason, if the corresponding cylindrical lens is tilted or decentered even slightly, the laser beam emitted from the anamorphic fθ lens towards the photoconductive drum tilts widely and accordingly the image quality of the anamorphic fθ lens deteriorates greatly. Considering this fact, it is preferable that each of the first and second scanning optical systems 20A and 20B should be provided with a lens (an elongated lens) having a power mainly in the sub-scanning direction in an optical path between the fθ lens group (25A or 25B) and the drum 10 so that the power of the overall optical system provided in the optical path between the polygon mirror 24A (or 24B) and the photosensitive drum 10 is shifted to the side of the drum 10. With such a lens having a power mainly in the sub-scanning direction, the aforementioned formula "|m|<1" can be satisfied, so that the incident position of each of the pair of scanning laser beams incident upon the photoconductive surface of the drum 10 can be finely adjusted in the sub-scanning direction by adjusting the position of the corresponding cylindrical lens 23A or 23B. The amount of shift of the incident position of each of the pair of scanning laser beams incident upon the photoconductive surface of the drum 10 is less when the corresponding cylindrical lens 23A (or 23B) is rotated than when shifted.

In each of the first and second embodiments, it is preferable that the mechanism for adjusting the position or angle of the cylindrical lens 23A or 23B (i.e., the aforementioned first mechanism) should be provided only for either the first or second scanning optical system 20A or 20B while another mechanism for adjusting the angle of the mirror 27A, 27B, 31 or 32 (i.e., the aforementioned second mechanism) should be provided for each of the first and second scanning optical systems 20A and 20B. According to this arrangement, although one of the cylindrical lenses 23A and 23B is fixed and unadjustable, the incident position of one of the pair of scanning laser beams incident upon the photoconductive surface of the drum 10 can be finely adjusted by the first mechanism relative to the incident position of the other of the pair of scanning laser beams incident upon the photoconductive surface of the drum 10, so that a fine adjusting operation using the first mechanism may be carried out after the incident position of each of the pair of scanning laser beams incident upon the photoconductive surface of the drum 10 has been roughly adjusted using the second mechanism. According to such an arrangement, an adjusting operation can be easily carried out, and at the same time the cost of production is reduced since the first mechanism is provided only for either the first or second scanning optical system 20A or 20B.

Figure 5:
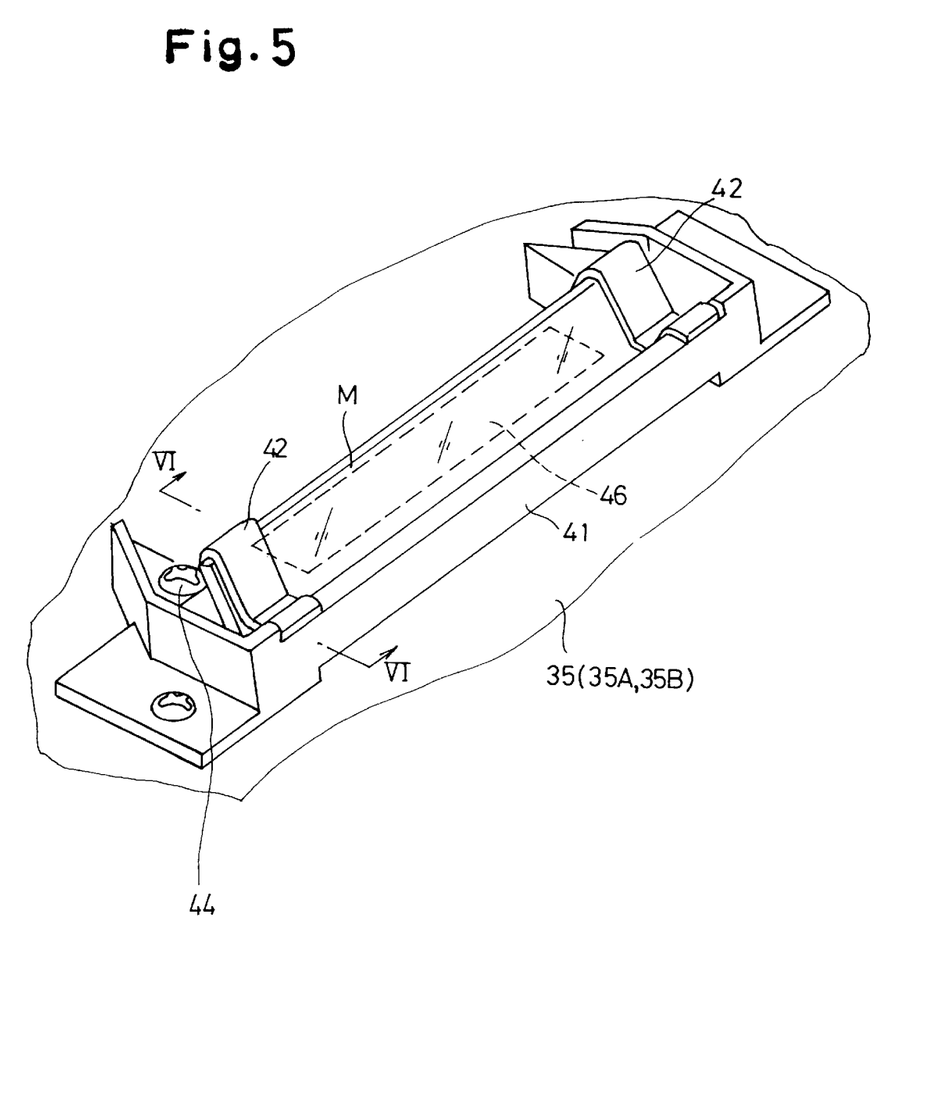
FIG. 5 is a perspective view of an embodiment of a mechanism for adjusting the angle of a mirror.
Figure 6:
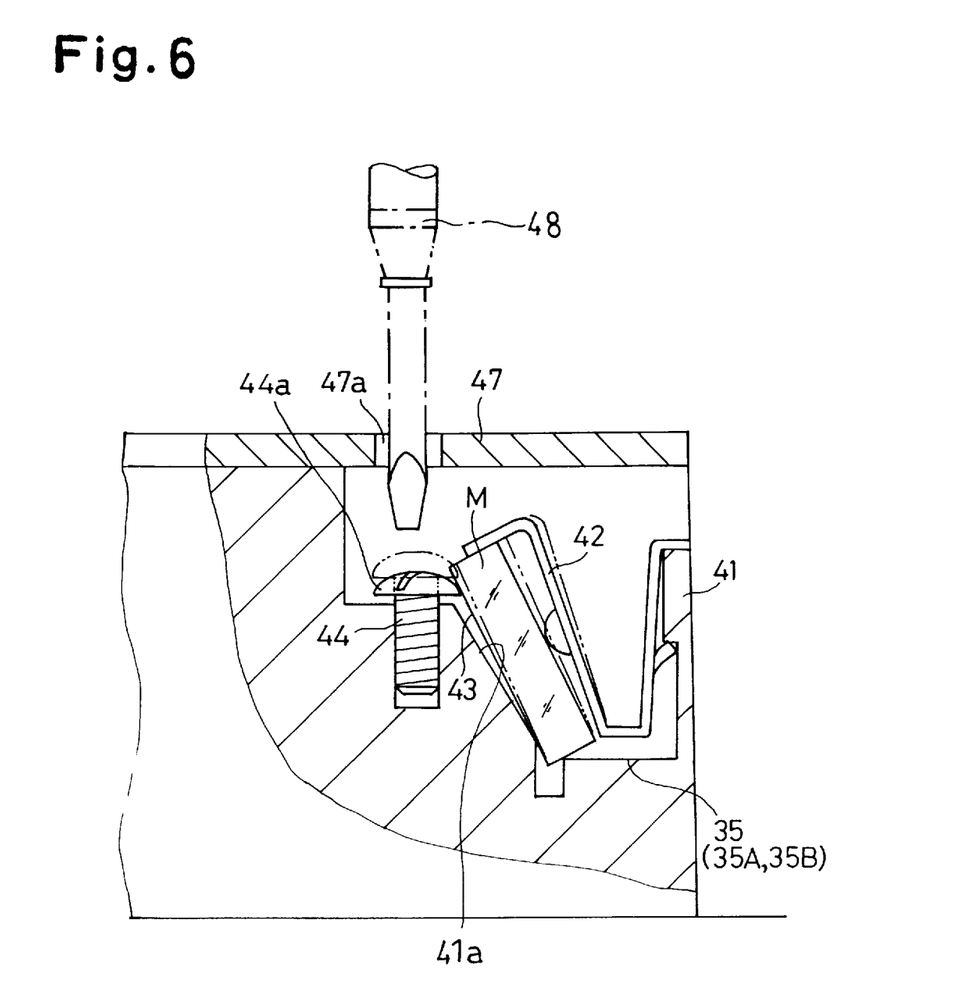
FIG. 6 is a cross-sectional view of the mechanism shown in FIG. 5, taken along the VI—VI shown in FIG. 5.

FIGS. 5 and 6 show an embodiment of the aforementioned second mechanism for adjusting the angle of the mirror 27A, 27B, 31 or 32. In each of FIGS. 5 and 6, the mirror 27A, 27B, 31 or 32 whose angle is to be adjusted by the second mechanism is generally designated by the letter "M". A supporting member 41 for supporting the mirror M is fixed on the corresponding casing 35, 35A or 35B. Each of the opposite ends of the mirror M is biased by a corresponding spring plate 42 towards a corresponding beveled surface 41a formed on the supporting member 41. The mirror M is provided at each opposite end thereof with a reference surface 43 which faces the corresponding beveled surface 41a. An adjusting screw 44 is screwed in the supporting member 41 in the vicinity of each of the beveled surfaces 41a such that the head of each screw 44 contacts the corresponding reference surface 43. Without the screws 44 being screwed in the supporting member 41 the reference surfaces 43 of the mirror M respectively abut against the beveled surfaces 41a due to the biasing force of the spring plates 42. With each of the screws 44 being screwed in the supporting member 41, the head of each screw 44 abuts against the corresponding reference surface 43, so that each of the reference surfaces 43 is apart from the corresponding beveled surface 41a, and the angle of the mirror M relative to the beveled surface 41a increases as each of the screws 44 is unscrewed. Hence, the angle of the mirror M relative to the photoconductive surface of the drum 10 can be adjusted by adjusting the screwed amount of each screw 44. For the mirror 27A, 27B or 32, the casing 35, 35A or 35B is provided with an elongated opening 46 (see FIG. 5) which extends substantially in the axial direction of the drum 10 to allow the laser beam incident on the mirror M to proceed to the drum 10 through the opening 46. A cover plate 47 having an insertion hole 47a is fixed on the casing 35, 35A or 35B. An adjusting tool 48 is inserted in the casing 35, 35A or 35B through the insertion hole 47a to rotate the screw 44. Using this type of second adjusting mechanism, the angle of the mirror M relative to the photoconductive surface of the drum 10 can be roughly adjusted.

Figure 7:
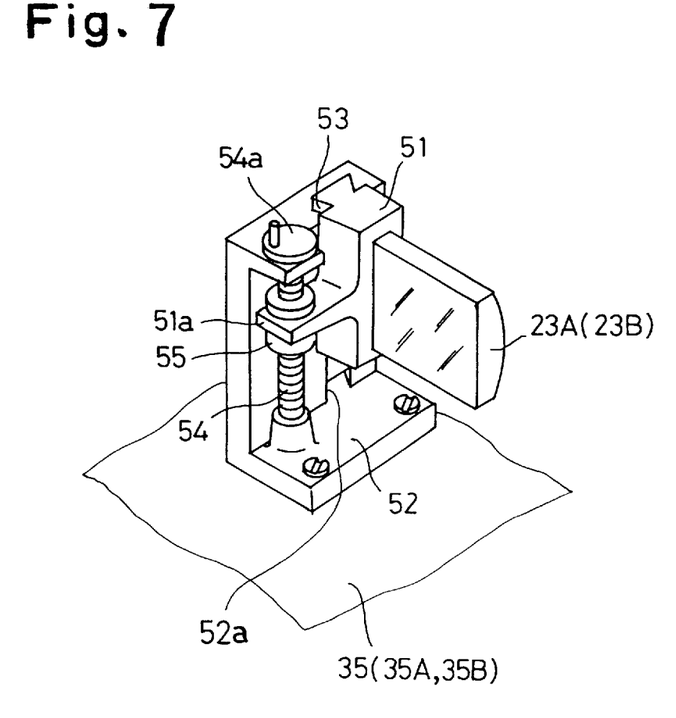
FIG. 7 is a perspective view of a mechanism for adjusting the position of a cylindrical lens.

FIG. 7 shows an embodiment of the aforementioned first mechanism for adjusting the angle of the cylindrical lens 23A or 23B. The cylindrical lens 23A or 23B whose position is to be adjusted is fixed to a holder 51 having a rail portion 53. A base member 52 is fixed on the casing 35, 35A or 35B. The base member 52 is provided with a guide groove 52a extending in a direction perpendicular to an optical path (i.e., the sub-scanning direction) between the corresponding laser collimating unit 21A or 21B and the polygon mirror 24A or 24B. The rail portion 53 is slidably fitted in the guide groove 52a, so that the cylindrical lens 23A or 23B supported by the holder 51 is guided in the direction perpendicular to the optical path between the corresponding laser collimating unit 21A or 21B and the polygon mirror 24A or 24B. A lead screw 54 extending in parallel to the guide groove 52a is rotatably supported by the base member 52. A knob 54a for manually rotating the lead screw 54 is fixed to the top end of the lead screw 54. The holder 51 is provided with an arm portion 51a to which a cylindrical member 55 having a female screw (not shown) on an inner periphery thereof is fixed. The cylindrical member 55 is fitted on the lead screw 54 with the female screw of the cylindrical member 55 being engaged with the lead screw 54, so that the cylindrical lens 23A or 23B can be shifted in the sub-scanning direction by rotating the knob 54a. Using this type of first adjusting mechanism, the position of the cylindrical lens 23A or 23B relative to the corresponding polygon mirror 24A or 24B can be finely adjusted.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cascade scanning optical system, comprising:

a pair of laser scanning optical systems each having a laser beam emitter and a laser beam deflector, wherein a laser beam emitted by said laser beam emitter enters said laser beam deflector so that said laser beam deflector deflects said laser beam to scan a surface of a member, such that said laser beams proceed to said surface on a common line thereon in respective ranges of said common line;

a pair of mirrors respectively provided in said pair of laser scanning optical systems, each of said pair of mirrors being positioned in a corresponding optical path between said laser beam deflector and said member to reflect a laser beam incident thereon toward said surface;

a pair of cylindrical lenses having a power in a sub-scanning direction, respectively provided in said pair of laser scanning optical systems, each of said pair of cylindrical lenses being positioned in a corresponding optical path between said laser emitter and said laser beam deflector;

a first adjuster that adjusts an angle of at least one of said pair of mirrors relative to said surface; and a second adjuster that adjusts a position of at least one of said pair of cylindrical lenses relative to a corresponding one of said laser beam deflectors.

2. The cascade scanning optical system according to claim 1, wherein said first adjuster is adjusted to adjust an incident position of a laser beam reflected by said at least one of said pair of mirrors to be incident on said surface, in said sub-scanning direction, and wherein said second adjuster is adjusted to adjust an incident position of a laser beam emitted from said at least one of said pair of cylindrical lenses to be incident on said corresponding one of said laser beam deflectors, in said sub-scanning direction.

3. The cascade scanning optical system according to claim 1, wherein a lateral magnification of an overall optical system provided in each of said pair of scanning optical systems in a corresponding optical path between said laser beam deflector and said member is predetermined, such that an absolute value of said lateral magnification is less than 1.

4. The cascade scanning optical system according to claim 1, wherein said first adjuster is adjusted for adjusting an angle of only one of said pair of mirrors relative to said surface, and wherein said second adjuster is adjusted for adjusting a position of each of said cylindrical lenses relative to said corresponding one of said laser beam deflectors.

5. The cascade scanning optical system according to claim 1, wherein said second adjuster is adjusted for adjusting an angular position of said at least one of said pair of cylindrical lenses relative to said corresponding one of said laser beam deflectors by rotating said at least one of said pair of cylindrical lenses.

6. The cascade scanning optical system according to claim 1, wherein said second adjuster is adjusted for adjusting said position by shifting said at least one of said pair of cylindrical lenses in said sub-scanning direction.

7. The cascade scanning optical system according to claim 1, wherein said member comprises a drum having said surface on a periphery of said drum, wherein said laser beam deflector deflects said laser beam to scan said surface, such that said laser beams proceed to said surface on said common line thereon extending in an axial direction of said drum in said respective ranges of said common line.

8. The cascade scanning optical system according to claim 1, wherein said laser beam deflector comprises a polygon mirror.

9. A cascade scanning optical system, comprising:

a pair of laser scanning optical systems each having a laser beam emitter and a polygon mirror, wherein a laser beam emitted by said laser beam emitter enters said polygon mirror so that said polygon mirror deflects said laser beam to scan a surface of a drum, such that said laser beams proceed to said surface on a common line thereon extending in an axial direction of said drum in respective ranges of said common line;

a pair of mirrors respectively provided in said pair of laser scanning optical systems, each of said pair of mirrors being positioned in a corresponding optical path between said polygon mirror and said drum to reflect a laser beam incident thereon toward said surface;

a pair of cylindrical lenses, each of said pair of cylindrical lenses having power in a sub-scanning direction, respectively provided in said pair of laser scanning optical systems, each of said pair of cylindrical lenses being positioned in a corresponding optical path between said laser beam emitter and said polygon mirror;

a first adjusting device that adjusts an angle of one of said pair of mirrors relative to said surface;

a second adjusting device that adjusts a position of one of said pair of cylindrical lenses relative to a corresponding one of said polygon mirrors; and a third adjusting device that adjusts a position of the other of said pair of cylindrical lenses relative to the other of said polygon mirrors.

\* \* \* \* \*

UNITED STATES PATENT AND TRADEMARK OFFICE
CERTIFICATE OF CORRECTION

PATENT NO. : 5,828,479
DATED : October 27, 1998
INVENTOR(S) : Masatoshi TAKANO et al.

It is certified that error appears in the above-identified patent and that said Letters Patent is hereby corrected as shown below:

On the title page:

At item [56] line 20, Reference Cited U.S. Patent Documents (first column, line 2) insert the followings: should be included.

---5,504,613, 4/1996, Itabashi et al.---

---5,506,719, 4/1996, Murakami et al.---

Signed and Sealed this

Twenty-fifth Day of January, 2000

Attest:

*Attesting Officer*

*Acting Commissioner of Patents and Trademarks*